UNITED STATES PATENT OFFICE.

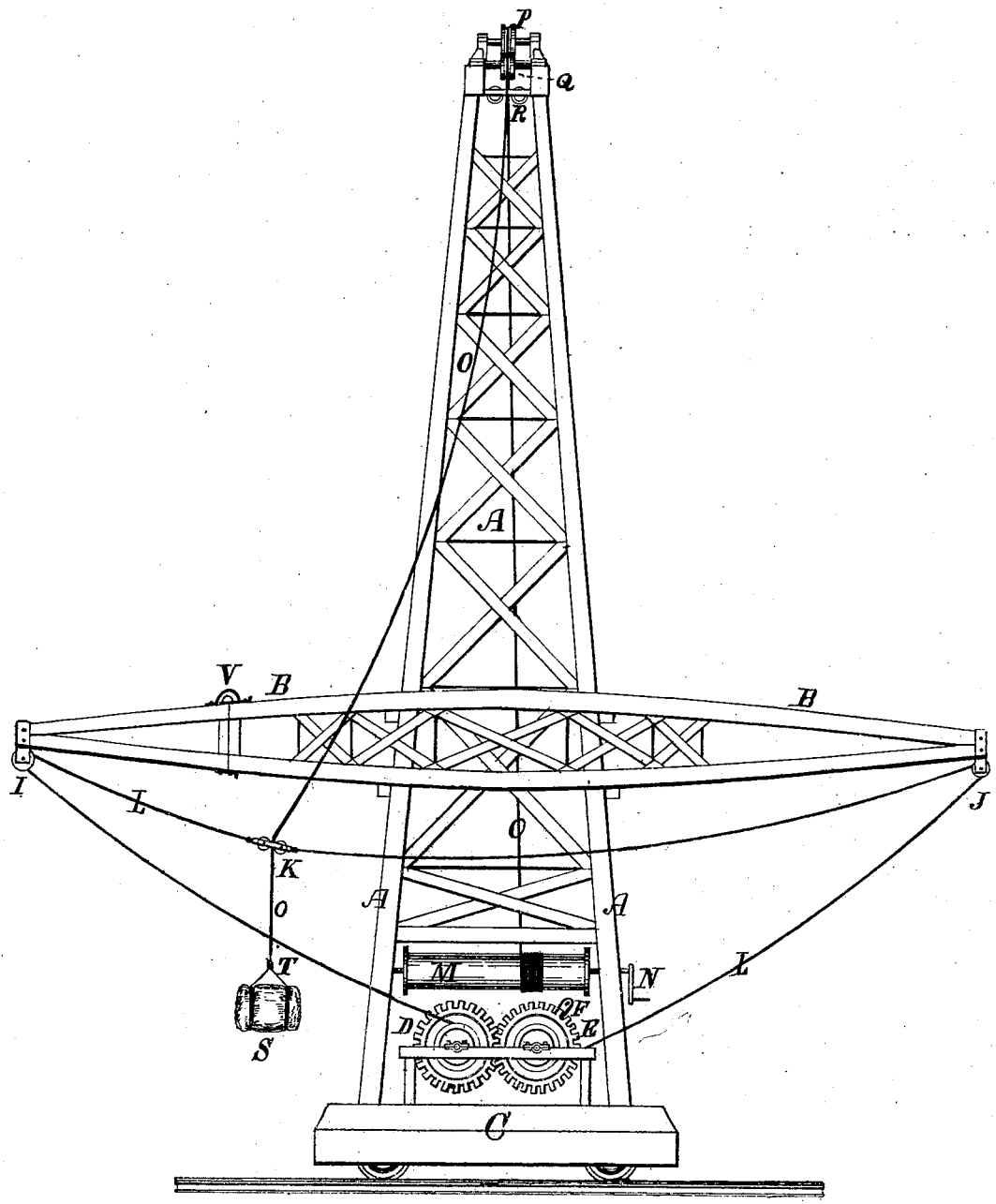

WILLIAM C. WETHERILL, OF YOUNGSTOWN, OHIO.

IMPROVEMENT IN DERRICKS.

Specification forming part of Letters Patent No. 167,863, dated September 21, 1875; application filed May 19, 1875.

*To all whom it may concern:*

Be it known that I, WILLIAM C. WETHERILL, of Youngstown, in the State of Ohio, have invented a new and useful Derrick, of which the following is a specification:

My invention relates to derricks for loading and unloading vessels, handling heavy material, and the like.

The drawing is a front elevation of the derrick, showing the entire construction.

My invention is a substitute for the common pole or lever derrick. It consists substantially of an upright tapering scaffolding, conveniently made and braced, and mounted upon wheels upon a truck, carrying in front, at a point conveniently near the ground, a horizontal arm rigidly attached and at right angles to the same. Located immediately behind the arm are two drums gearing together by toothed wheels attached to them, and so arranged as to allow of their being thrown in or out of gear, motion being, when desired, imparted to them by means of a crank passing out to the rear of the scaffold. At both extremities of the arm are pulleys. Now, around one of these drums is wound a rope, which passes over a pulley on the scaffold, and thence over to one end of the arm, where it passes through the arm-pulley at that end. Over the other drum is wound a rope passing under a pulley on the scaffold and thence through the other arm-pulley. The free extremities of these ropes are fastened together in a double-pulley block in front of the arm.

Now, it will be understood readily that by rotating the crank of the drum the rope is unwound off one drum and wound upon the other, and that, therefore, the double-pulley block is drawn from end to end of the arm, as desired.

Crosswise upon the scaffold is placed a drum, with a crank-handle extending out at the side of the scaffold. Over this drum is wrapped a rope, which passes up behind and over two pulleys at the top of the scaffold, and down through a double pulley in front till it passes through the double pulley on the arm-rope and terminates in a hook. To the hook is attached the weight to be moved.

Now, it will be readily understood that the rotation of this drum will cause the weight to rise or lower, vertically, and if the tooth-drums are set in motion the weight will be carried from side to side, along the arm, by the action of the arm-ropes, the vertical rope being paid out to allow the motion.

It will be understood that a pendulum motion is thus imparted to the weight as it passes from side to side.

For the better information of the public, I will proceed to describe the construction of my invention.

A represents the scaffold; B, the arm; C, the scaffold-truck. The construction of these parts may be as most convenient—wood or light-metal work. D and E are the toothed drums, worked by hand or power; F, the crank-handle of the drum E. These drums are set in bearings, as most convenient. I and J are the arm-pulleys; K, the double pulley, whose function is to ease the lateral swing of the weight-rope. L is the arm-rope, which is coiled on the toothed drums D and E. M is the drum of the weight-rope, and N its crank. O is the weight-rope; P and Q the top pulleys. R is the double pulley to ease the weight-rope at the top; S, the weight; T, the hook. The side of the arm toward the vessel is jointed at V, so that the end of the arm may be raised or lowered vertically by the drum M and the weight-rope O.

Such being the construction of my invention, its mode of operation is as follows: The derrick is moved along the track to a point opposite the hold of a vessel. The weight-rope O is then lowered, the end of the arm beyond the joint V being lowered thereby until it rests at its proper position over the hold. The weight-rope is then unwound and lowered into the hold of the boat, the weight attached, and drawn up out of the hold, after which the arm-rope is wound back, carrying the weight with a pendulum motion, but in a straight line, directly to the other end of the arm, and then dropped.

The advantages over the old form of the derrick are in the time saved, the load in this case passing along the diameter, whereas, in the other, it passed on the arc.

Having thus described my invention, I claim—

The above-described derrick, consisting of the combination of the scaffold A, the arm B, the toothed drums D and E, the arm-rope L, the drum M, the weight-rope O, the whole constructed, arranged, and operating to carry a weight in a direct line, but with a pendulum motion, from one end of the arm B to the other, substantially as described.

W. C. WETHERILL.

Witnesses:
MASON EVANS,
U. A. ANDREWS.